United States Patent
Stan et al.

(10) Patent No.: US 6,813,224 B2
(45) Date of Patent: Nov. 2, 2004

(54) METHOD AND APPARATUS FOR READING AND/OR WRITING A DATA DISK

(75) Inventors: Gheorghe Sorin Stan, Eindhoven (NL); Andre Latenstein Van Voorst, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 447 days.

(21) Appl. No.: 10/066,446

(22) Filed: Jan. 31, 2002

(65) Prior Publication Data

US 2002/0118610 A1 Aug. 29, 2002

(30) Foreign Application Priority Data

Feb. 28, 2001 (EP) .............................................. 01200744

(51) Int. Cl.[7] ................................................. G11B 7/00
(52) U.S. Cl. ................................. 369/30.23; 369/30.12; 369/44.28
(58) Field of Search ........................... 369/30.23, 30.17, 369/30.1, 30.11, 30.12, 30.13, 30.14, 30.15, 30.16, 44.28, 44.29, 44.35, 44.27, 44.26, 53.3, 32.01

(56) References Cited

U.S. PATENT DOCUMENTS

| | | | | |
|---|---|---|---|---|
| 5,121,372 A | * | 6/1992 | Tominaga | 369/44.26 |
| 5,905,701 A | * | 5/1999 | Lee et al. | 369/44.28 |
| 6,442,111 B1 | * | 8/2002 | Takahashi et al. | 369/44.28 |

* cited by examiner

*Primary Examiner*—Ali Neyzari
(74) *Attorney, Agent, or Firm*—Michael E. Belk

(57) ABSTRACT

A method and an apparatus for reading and/or writing data on a disk (1) storing data in a continuous spiral form (2). The data is simultaneously read from or written to N tracks (4–8, 12–20) by N spots, N being an integer larger than or equal to 2. The reading and/or writing is performed by alternating between reading/writing and actuator jumps. In order to increase the efficiency of such multi track disk drives a next jump decision is calculated dynamically on the basis of a real-time analysis determining a next position of a unit (23) for reading/writing data relative to the disk (1).

11 Claims, 9 Drawing Sheets

| Line | Read & buffer | Actuator Jump | Equivalent data time | | Output data |
|---|---|---|---|---|---|
| | | | Buffered data from disc (physical disc revolutions) | | |
| 1 | 1a-1b | | Trot | | 3Trot |
| 2 | | 1b-2a | Tact | | |
| 3 | 2a-2b | | Trot - 2Tact | | |
| 4 | | 2b-3a | | Tact | |
| 5 | 3a-3b | | Tact | | Trot - Tact |
| 6 | | 3b-4a | Trot - 4Tact | | |
| 7 | 4a-4b | | | Tact | |
| 8 | | 4b-5a | | Tact | |
| 9 | 5a-5b | | | Tact | 2Trot + Tact |
| 10 | | | Total time: 3Trot | | 6Trot |
| 11 | 6a-6b | | Tact | | |
| 12 | | 5b-6a | Trot - 4Tact | | |
| 13 | 7a-7b | | | Tact | |
| 14 | | 6b-7a | | | |
| 15 | 8a-8b | | 2Tact | | |
| 16 | | 7b-8a | | Tact | Trot - Tact |
| 17 | | 8b-9a | Trot - 7Tact | | |
| 18 | 9a-9b | | | Tact | |
| 19 | | 9b-10a | | Tact | |
| 20 | 10a-10b | | Tact | | |
| 21 | | 10b-11a | | | |
| 22 | 11a-11b | | 2Tact | | 3Trot - Tact |
| 23 | | | Total time: 2Trot + Tact | | 4Trot - 2Tact |

→ Fig. 1 (lines 1–2)
→ Fig. 2 (line 3)
→ Fig. 3 (lines 4–5)
→ Fig. 4 (lines 6–7)
→ Fig. 5 (lines 8–9)
→ Fig. 6 (lines 11–12)
→ Fig. 7 (lines 13–14)
→ Fig. 8 (lines 15–16)
→ Fig. 9 (lines 17–22)

FIG. 10

METHOD AND APPARATUS FOR READING AND/OR WRITING A DATA DISK

BACKGROUND OF THE INVENTION

The invention relates to a method for reading and/or writing a data disk wherein said data is stored on said data disk in a continuous spiral form, thereby rotating said disk relative to a reading and/or writing unit for reading and/or writing said disk, said reading and/or writing unit being actuated by actuating means, and reading and/or writing said data simultaneously in N tracks by N spots, N being an integer greater than or equal to 2, the reading and/or writing being performed by alternating between a continuous reading and/or writing and an actuator jump.

Furthermore, the invention relates to an apparatus for reading and/or writing a data disk, the data being stored on said disk in a continuous spiral form, the apparatus comprising rotating means for rotating said data disk relative to a reading and/or writing unit for reading and/or writing said data, said reading and/or writing unit comprising reading and/or writing means having N spots for reading and/or writing said data simultaneously from/in N tracks, N being an integer greater than or equal to 2, and actuator means for actuating said reading and/or writing unit being designed to perform alternation between a continuous reading and/or writing and an actuator jump.

In the field of optical disks, such as CD (Compact Disk) and DVD (Digital Video Disk) data is arranged along a continuous spiral. Such data can be read by a single track read-only disk drive with one laser spot or with a multi-track read-only disk drive with N laser spots reading N adjacent tracks simultaneously, N being an integer greater than or equal to 2. Several solutions have been proposed how to perform jumps of a reading head or actuator jumps of an actuator actuating such a reading head to completely read the spiral. It appears, that from time to time less than N spots must be used for reading. The reason is that once the N spots have read simultaneously one disk revolution, a small actuator jump must be performed to a new position. Because a jump cannot be performed in zero time, a gap in the read spiral section occurs. The reading head must therefore come back and retrieve this data. Basically, it is possible to use one spot only from time to time to read the remaining data along one track of a section of a spiral turn. Although, at a certain point, the reading with one spot only cannot be avoided, such limited use of a multi-track read-only drive is disadvantageous since it leads to inefficiency.

SUMMARY OF THE INVENTION

It is therefore an object of the invention to improve the efficiency of multi-track disk drives.

This object is achieved by providing a method according to the above-mentioned type being characterized by calculating the next actuator jump dynamically on the basis of a real-time analysis determining a next position of said reading and/or writing unit relative to said disk.

The object is further achieved by providing an apparatus according to the above-mentioned type being characterized by calculation means being designed for calculating the next actuator jump dynamically on the basis of a real-time analysis determining the next position of said reading and/or writing unit relative to said disk.

The invention allows to overcome the limitations of known algorithms for multi-track disk drives due to the fact that parts of the tracks must be read using only one spot by performing a real-time analysis for determining the next position of a reading and/or writing unit, thus no particular fixed pattern for actuator jumps has to be employed. Thus, a most-optimal jump decision can be calculated for the reading and/or writing unit any time, thereby taking into account a plurality of rules.

Furthermore, the invention enables to solve a conflict between lower disk rotational periods and relatively large times needed to perform an actuator jump, since the algorithm according to the invention calculates dynamically the next jump position independent from any time slots. Thus, this algorithm can be easily implemented in successive generations of drives.

Preferably, data is read or written from a complete disk revolution after a seek command has been performed. This has the advantage that linking of all N spiral turns can be immediately carried out and a user will only notice a delay due to the mechanical seek.

Preferably, a jump decision is made based on the following rules: a) encouraging the use of all N spots, b) prohibiting track jumps larger than 2N tracks, c) reading and/or writing shorter spiral sections resulted from read or write gaps resulting from unread or unwritten spiral sections at an inner radius before longer spiral sections, d) privileging actuator jumps towards the inner disk radius if there is no read or write gap to be decided for, e) allowing actuator jumps towards the inner as well as the outer disk radius, and/or f) reading and/or writing short spiral sections twice if this can be accomplished in less time than jumping to another position towards the outer disk radius. Thereby, preferably, rule a) has priority over rule b), rule b) has priority over rule c), rule c) has priority over rule d), rule d) has priority over rule e) and/or rule e) has priority over rule f). Due to these rules all jumps can be calculated in a very efficient manner. Thus, it is possible for an N-spot system to link buffered data from any point between −2N and +2N tracks with respect to its current position.

Preferably, the next jump position of the reading and/or writing unit is calculated for several disk revolutions in advance. A simple genetic-like algorithm can be employed to calculate the optimal choice. The main constraints are, however, to read out first remaining gaps along the disk spiral while still using all N spots and to ensure a continuous stream of data. Thus, it is rendered possible to position the N spots at a location that results, at the same time, in maximum read out or writing throughput and in continuity of data flow, thus increasing the efficiency of the system.

Preferably, a disk rotational frequency is calculated depending on a time to elapse before a data buffer for buffering data will run out of data. In particular, the next jump position is calculated depending on this time to elapse. If it is likely that the buffer will run out of data, the system may overrule the most-optimal jump decision and/or slightly reduce the spinning rate. On the contrary, if there is enough data in the buffer the algorithm may decide to read N spiral turns further away instead of completing only one spiral turn at the inner side.

These and other aspects of the invention will be apparent from and elucidated with reference to the embodiments described hereinafter with reference to the accompanying drawings, in which:

BRIEF DESCRIPTION OF DRAWINGS

FIG. 10 shows a table for explanation of playback and time intervals and data availability in a output buffer.

DETAILS DESCRIPTION OF THE PREFERRED EMBODIMENT

Figure 1:
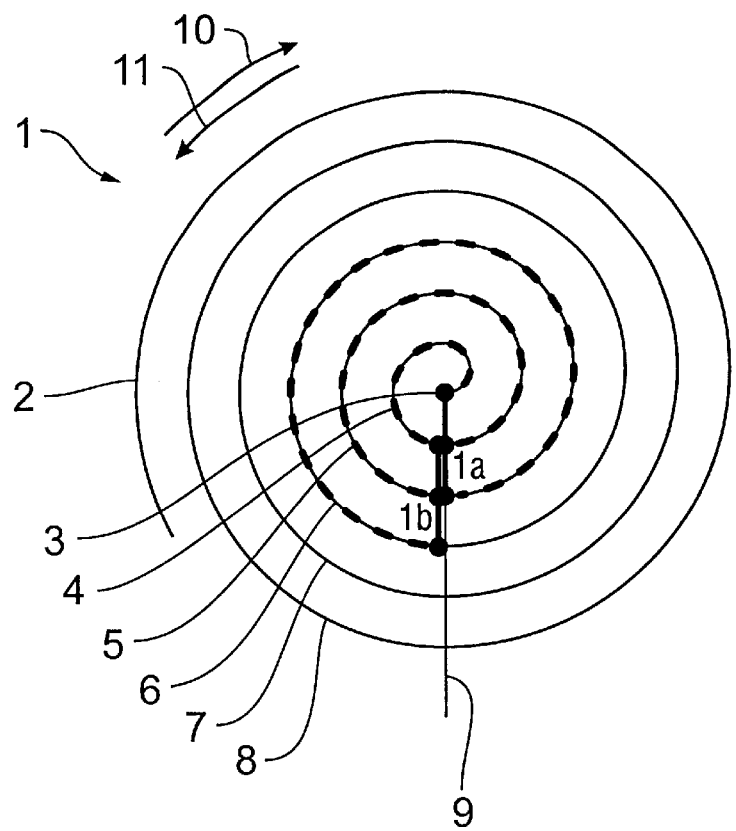
FIGS. 1 to 9 show schematic diagrams of a disk for explaining a method for reading and/or writing multiple tracks using a reading and/or writing algorithm according to a preferred embodiment of the invention.

FIG. 1 shows schematically a read-only optical disk 1, such as a CD or DVD. Data is written on the disk 1 on a continuous spiral 2 beginning in the region of the center 3 of the disk 1 and continuing towards the outer radius of the disk 1. Thus, data is stored on the disk 1 along a continuous spiral from the inner to the outer radius.

According to FIG. 1 the spiral 2 is divided into a plurality of imaginary tracks 4, 5, 6, 7, 8 each track 4–8 being formed by a section of 360° of the spiral, i.e. an imaginary radial line 9 divides the spiral 2 in these tracks 4–8. According to FIGS. 4–9 further tracks 12–20 are shown being created in the same manner. It has to be noted that a data disk, of course, consists of considerably more tracks as shown in the Figures. However, for the sake of simplicity, only those tracks that are necessary to understand the actual actuator jump(s) and/or reading and/or writing process(es) are shown in the figures.

In the embodiment shown in the FIGS. 1–9 a reading and/or writing unit is used that is capable of reading and/or writing N=3 tracks simultaneously by means of N=3 spots.

Hereinafter with reference to the FIGS. 1–11 only the reading of the read-only optical disk 1 is described. However, it is within the scope of the invention that writing may be performed in a similar manner.

Read out starts at a position 1a with N=3 spots in a radial line, the spots being generated by N=3 light beams. The read out starts right after a seek command has been entirely carried out. The disk 1 is rotating in a clockwise direction as being indicated by arrow 10. Alternatively or additionally, the N=3 spots can be rotated in a counter-clockwise direction as being indicated by arrow 11. Due to the circular shape of the disk 1 it is preferred that the N=3 spots remain fixed with regard to their angular or circumferential position while the disk 1 is rotating. Accordingly, the reading/writing unit generating the spots remains in a fixed angular or circumferential position. Moreover, the position of the N=3 spots and the reading/writing unit is not fixed but moveable in the radial direction.

In FIGS. 1–9, playback paths, i.e. read spiral sections of the track 2 are situated between a start position denoted by "a" and an end position denoted by "b", respectively. The numbers preceding these letters identify a sequence of read out spiral sections.

It should also be noted that, on some disks (e.g. DVD) data is organized in blocks to be read out completely before any actuator jump to another location is performed. For the sake of simplicity, it is assumed on all figures that all partial tracks can be read simultaneously by N spots up to the same imaginary radial line. In reality, the N spiral read simultaneously have different end points and the algorithm according to preferred embodiment of the present invention takes this fact into account.

In FIG. 1 a complete rotation of 360° of the disk 1 is performed, thereby reading the data of N=3 tracks 4, 5, 6 simultaneously as being indicated by broken lines.

This situation is indicated in line 1 of the table according to FIG. 10. The reading of the N=3 tracks 4, 5, 6 according to FIG. 1 results in a continuous output of data corresponding to an equivalent data time of $3T_{rot}$ whereas the time needed to read these N=3 tracks is $T_{rot}$ as may be taken from FIG. 10, line 1. $T_{rot}$ indicates the disk rotational period for one revolution of the disk, i.e. 360° which is preferably in the range of 14 to 20 msec.

Figure 2:
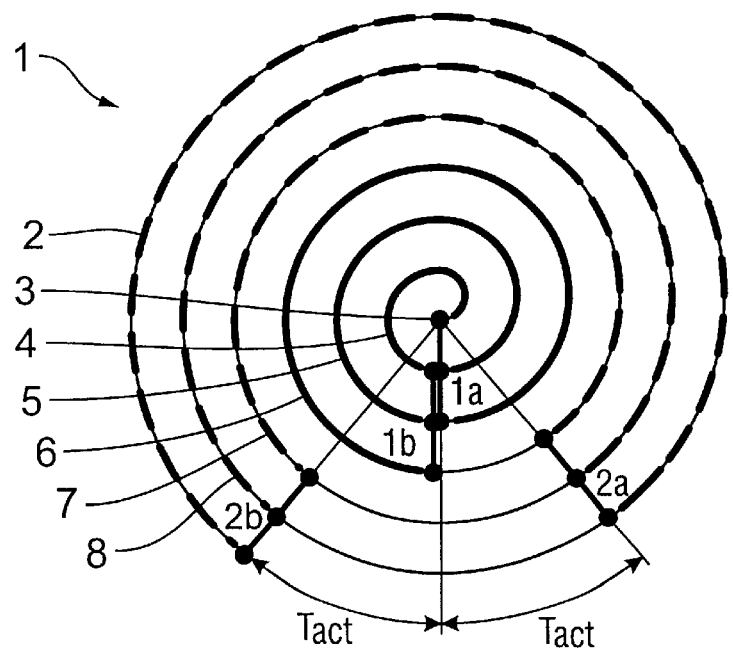

Next, according to FIG. 2 the N=3 spots move from the position 1b to position 2a. This move is performed by an actuator jump of N=3 tracks onwards, i.e. an actuator actuating the reading unit from an inner position to an outer position with regard to the disk 1. As this jump takes time and the disk 1 is still rotating in the direction of arrow 10 the next start position begins at position 2a being at a distance of N=3 tracks in the radial direction and a distance corresponding to an angle indicated by $T_{act}$ in FIG. 2 in an circumferential direction. $T_{act}$ also denotes the time needed for performing an actuator jump. Typically, $T_{act}$ is in the range of 3–13 msec, in particular 8–10 msec.

The end position of the N=3 tracks read according to FIG. 2 is calculated in such a manner that when a next jump is performed the next spiral sections of tracks can be placed such in order to continue the reading of track 6 at the position 1b. Thus, the end of the playback path according to the broken lines of FIG. 2 is calculated for the position 2b being located at an angle corresponding to $T_{act}$ before the position 1b.

According to the table shown in FIG. 10 the time needed for the actuator jump from position 1b–2a is $T_{act}$ as being indicated by line 2 of the table. The time needed for reading the playback path indicated by the broken lines of FIG. 2 is calculated to $T_{rot}-2T_{act}$ as being indicated by line 3 of the table according to FIG. 10.

Figure 3:
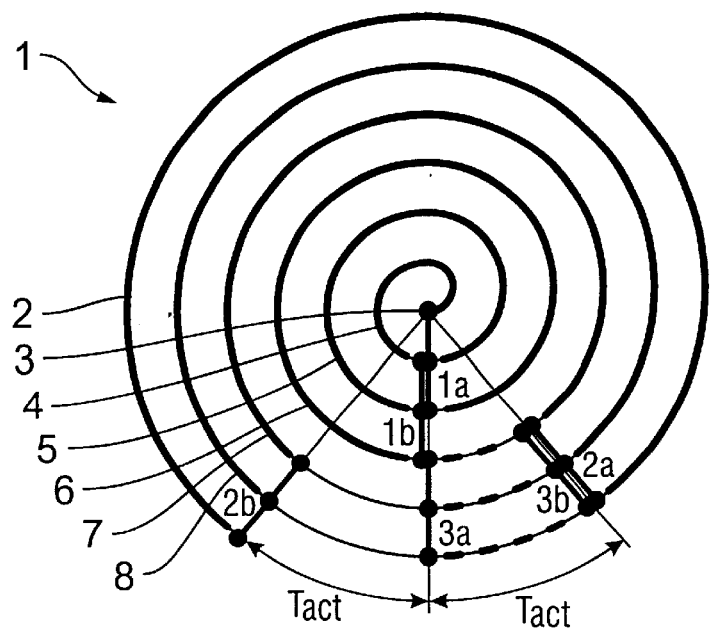

FIG. 3 shows in solid lines the tracks or sections of tracks that have been read so far and have been buffered in a data buffer. However, there are still only N=3 continuous data tracks available in the buffer when position 2b is reached due to a gap resulting from the actuator jump from position 1b to position 2a.

The next actuator jump is performed from position 2b to position 3a thereby moving one track towards the center 3 of the spiral 2. The time needed for this actuator jump is $T_{act}$ again. Due to the calculation that has been performed before this jump the next playback path begins at position 3a, thus, continuing track 6 at the position 1b.

According to the table shown in FIG. 10, in particular line 4, the time needed for performing the actuator jump is $T_{act}$ and the time for reading the read spiral sections between the position 3a and the position 3b according to the broken lines shown in FIG. 3 is $T_{act}$.

After reading of these spiral sections according to the broken lines of FIG. 3 a continuous spiral of data corresponding to a time of $T_{rot}-T_{act}$ has been added to the continuous output data of $3T_{rot}$ as being indicated by the solid line of FIG. 2. This continuous output data is indicated in FIG. 4 by the inner solid lines forming a spiral beginning at the center 3 and ending at the position 2b of track 7.

Figure 4:
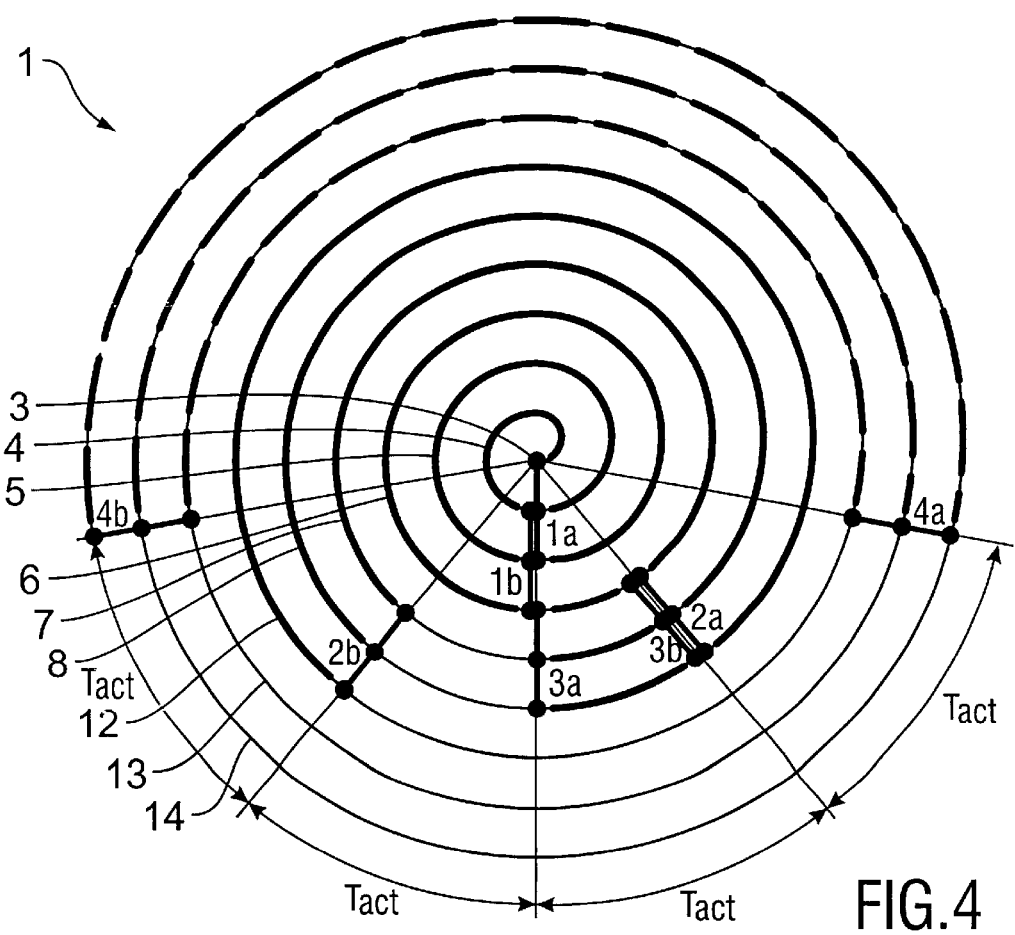
Figure 5:
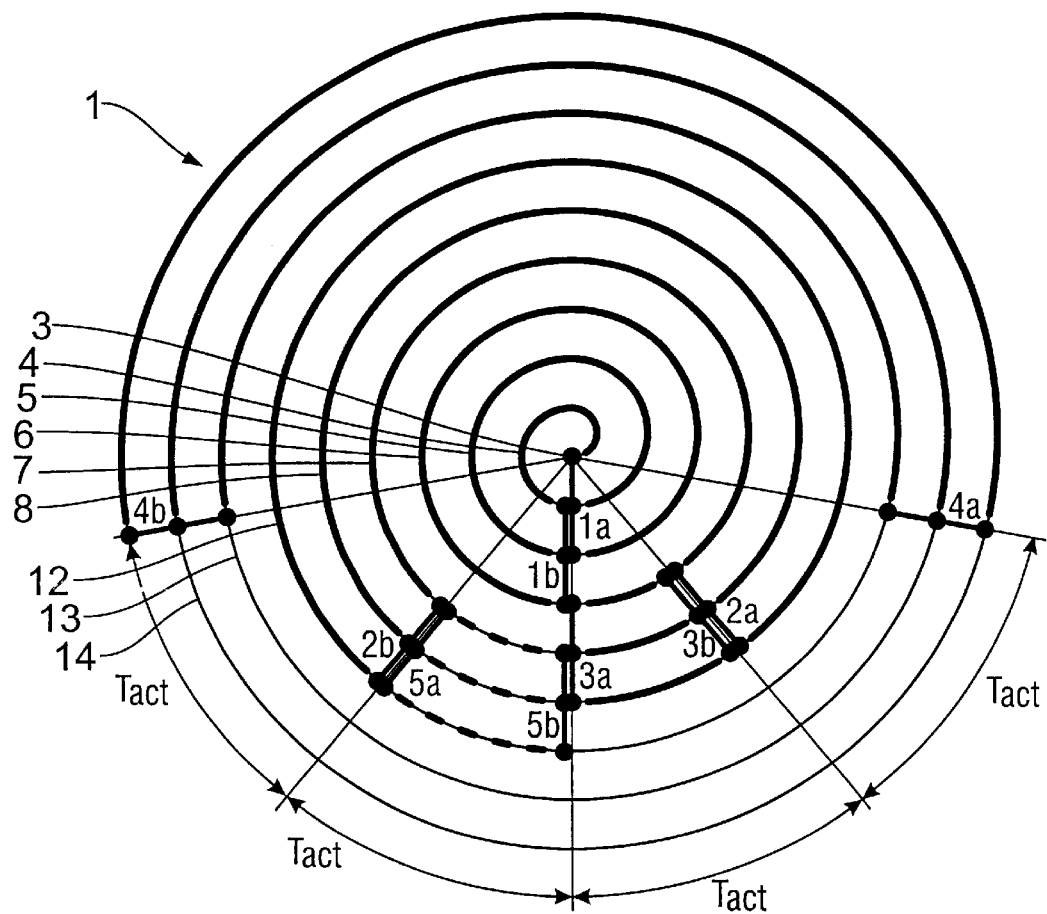

According to FIG. 4 a next track jump is performed by jumping N=3 tracks towards the outer radius of the disk 1 to position 4a being in a circumferential distance of an angle corresponding to $T_{act}$. Thus, the next spiral sections start at position 4a and are calculated to end at position 4b as being indicated by the broken lines of FIG. 4.

The position 4b is calculated on the basis of the tracks or sectors of tracks read so far. In order to continue the tracks 7, 8 and 12 at the position 2*b* the position 4*b* is determined as being located at an angle corresponding to $T_{act}$ before the position 2*b*. Thus, an actuator jump can be performed after the position 4*b* is reached jumping N=3 tracks towards the center 3 resulting in a start position 5*a* (FIG. 5) for the next spiral sections beginning at the end position 2*b*. According to the broken lines of FIG. 5 further spiral sections between the start position 5*a* and the end position 5*b* are read for a duration corresponding to $T_{act}$. After this read out has been performed a continuous output data corresponding to $2T_{rot}+T_{act}$ has been added to the continuous output data read so far corresponding to $4T_{rot}-T_{act}$. This is indicated in line 9 of the table according to FIG. 10.

The next jump from position 5*b* onwards may account for two tracks towards the outer disk radius. However, the inner turn of the 3-track spiral to be read out cannot be linked entirely with the beginning of the position 4*a*. It is therefore proposed to jump 2N−1=5 tracks and store data from this point onwards. This can be taken from FIG. 6. If needed, the disk spinning rate or rotational frequency may be slightly lowered.

Between the first track of position 1*a* and the outer track 12 ending at the position 5*b* we have now continuous data equivalent to 6 disk rotations while disk 1 has only rotated three times. This results in an efficiency of the read out algorithm of 66.7%.

Figure 6:
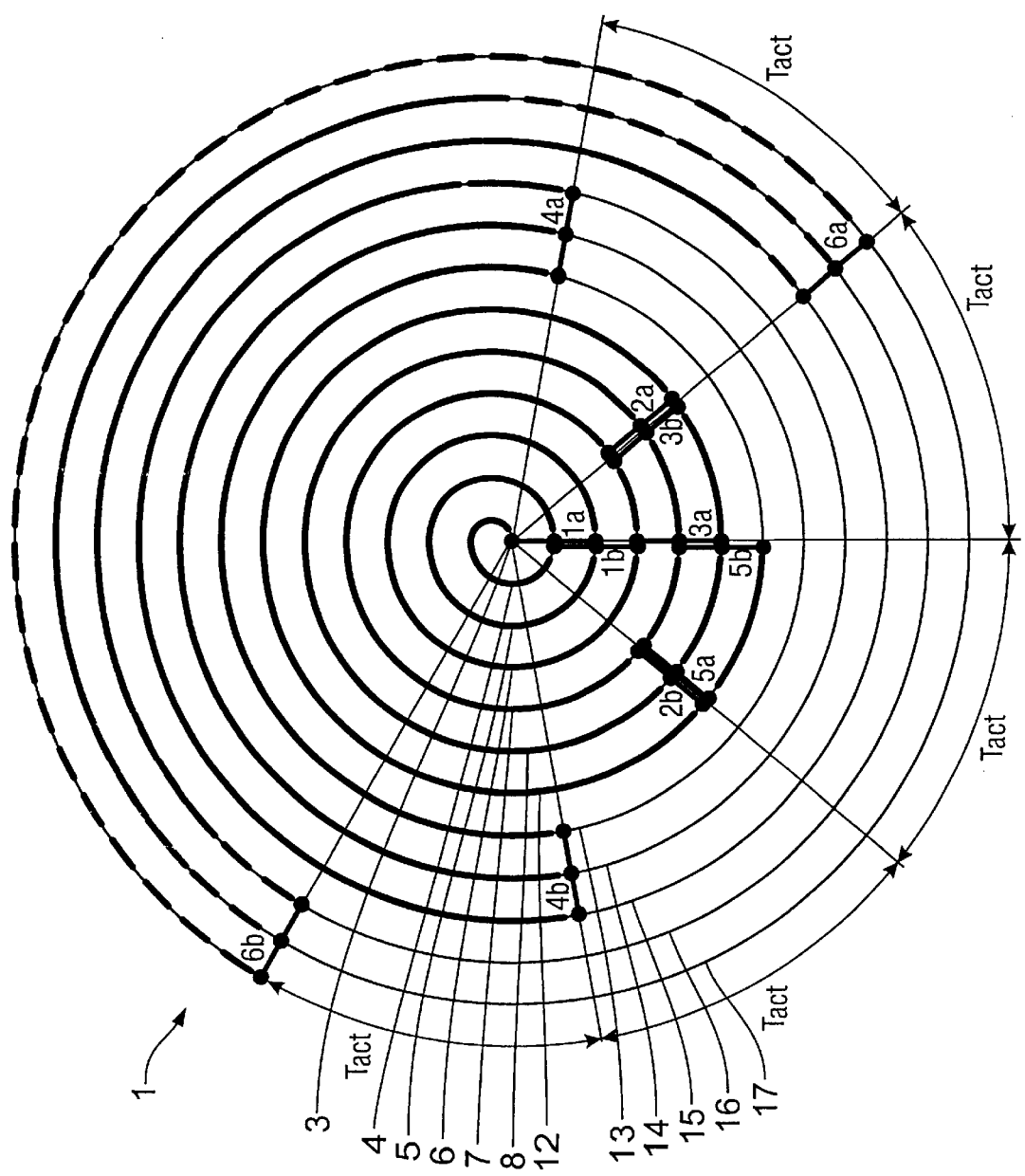

For the next spiral sections to be read, following the sections from position 5*a* to position 5*b*, two choices can be considered: either spiral sections from position 6*a* to position 6*b* as being indicated by the broken lines of FIG. 6 or from position 6*a* to position 6*b'*.

Irrespective of the choice, there is only one optimal continuation, namely to playback N=3 spiral sections at the inner side and connecting with position 4*a*. Because the disk 1 keeps spinning while the actuator is jumping, the above two choices are equivalent from a timing viewpoint. The former choice is, however, better because it fills already the buffer with data following the 4*b* end position.

Nevertheless, according to FIG. 6 the algorithm decides to read the spiral sections beginning at position 6*a* and ending at position 6*b* thus performing an actuator jump of 2N−1=5 tracks towards the outer radius.

Position 6*b* is chosen as the end position in order to continue after a jump time $T_{act}$ at the end position 4*b* N=3 tracks towards the inner radius of the disk 1.

According to FIG. 10 the time needed for reading the playback paths beginning at the position 6*a* and ending at the position 6*b* is $T_{rot}-4T_{act}$ as being indicated in line 12 of the table according to FIG. 10. Furthermore, according to line 11 of the table according to FIG. 10 the time for performing the actuator jump from position 5*b* to position 6*a* is $T_{act}$.

Figure 7:
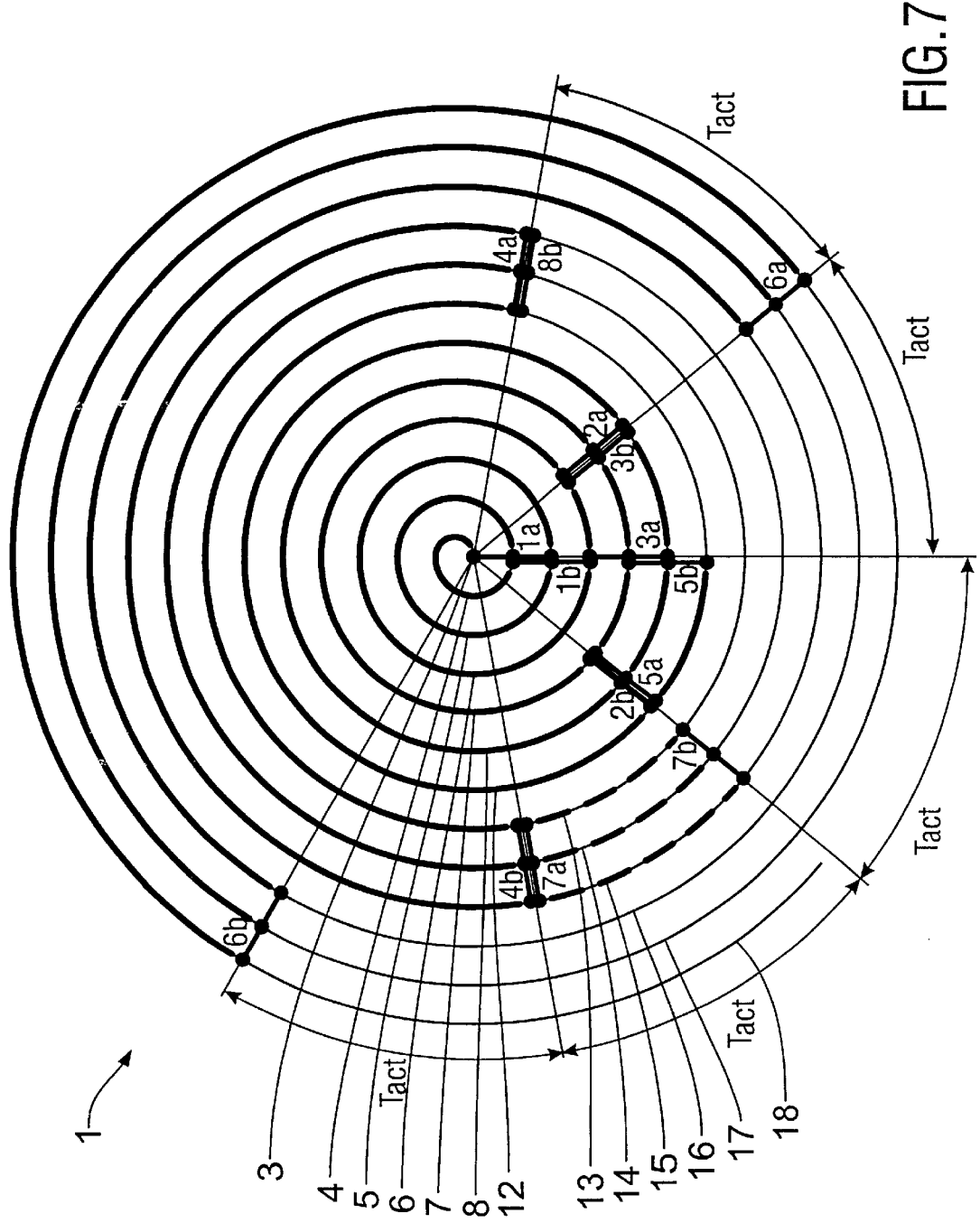

As shown in FIG. 7 indicated by the broken lines the next read out starts at the position 7*a* being N=3 tracks towards the inner radius of the disk 1 an angle corresponding to $T_{act}$ with respect to the position 6*b*.

The end of the playback paths indicated by the broken lines in FIG. 7 is calculated such that the next playback paths begin at a position following the position 5*b* in order to continue the continuous path beginning at the center 3 and ending at the position 5*b* of track 12.

Thus, according to FIG. 7 and as may be taken from the table according to FIG. 10, namely line 14 data is buffered equivalent to $T_{act}$.

The next actuator jump from position 7*b* to position 8*a* takes the time $T_{act}$ as being indicated in line 15 of the table shown in FIG. 10. The next spiral sections to be read begin at position 8*a* and end at the position 8*b* that correspond to position 4*a*, namely the beginning of the already read spiral sections from 4*a* to 4*b* as described with reference to FIG. 4.

Figure 8:
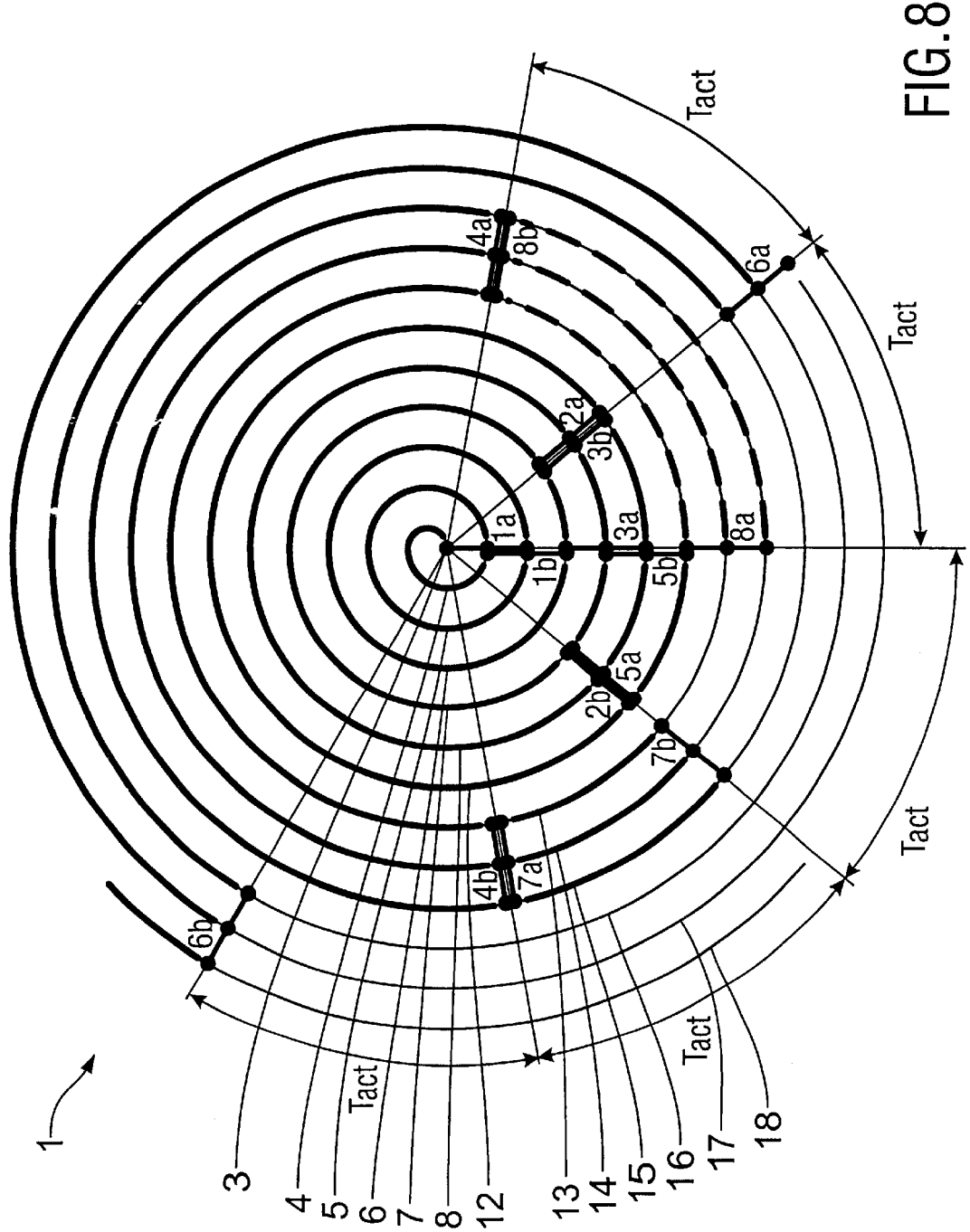

Thus, further continuous output data equivalent to the time $T_{rot}-T_{act}$ has been added during the read out shown in FIGS. 6, 7 and 8, namely starting at the position 5*b* of track 12 and ending at the position 7*b* of track 13.

The data buffered during the read out according to FIG. 8 is equivalent to $2T_{act}$ as being indicated by the broken lines of FIG. 8.

Figure 9:
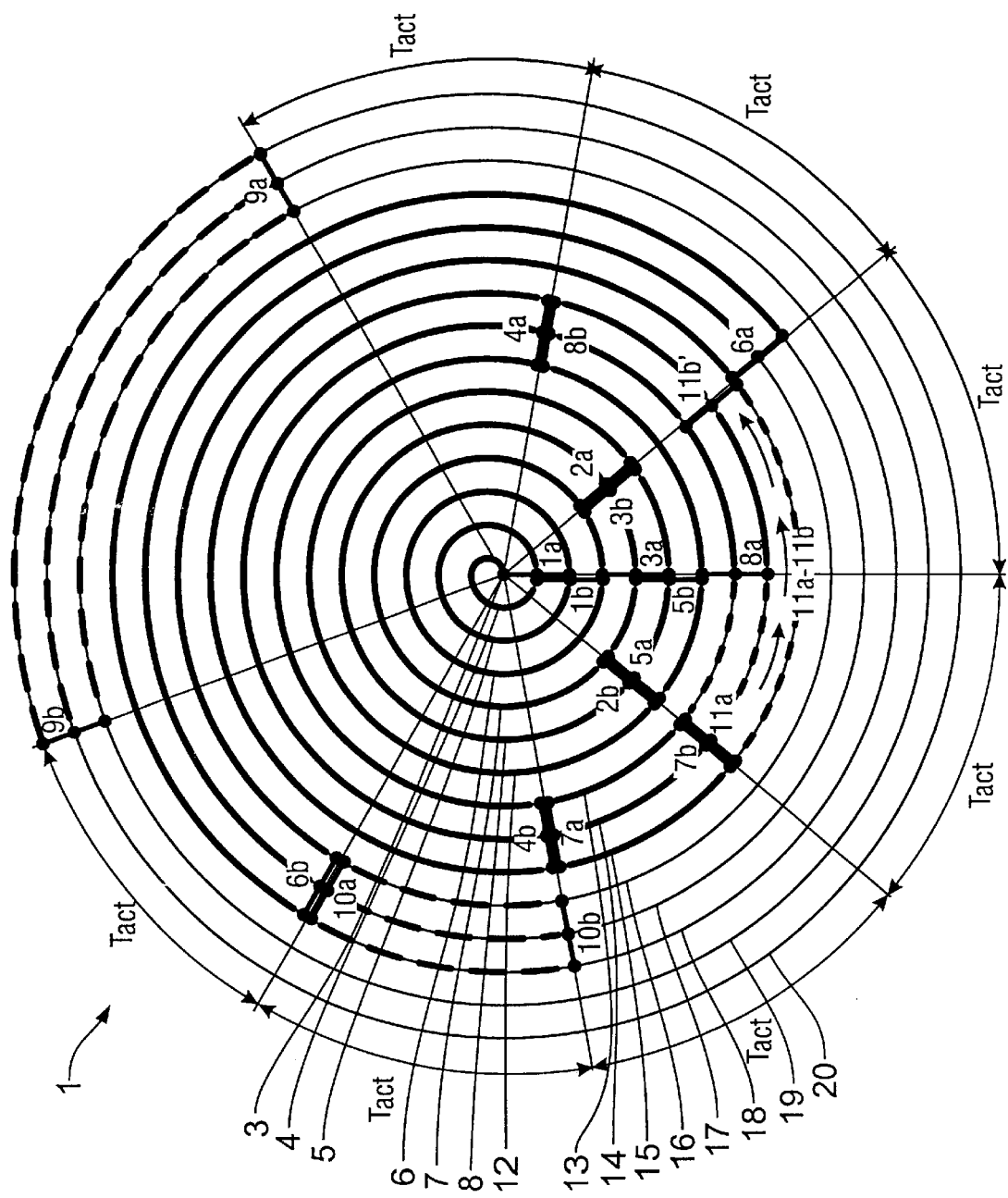

According to FIG. 9 the next jump is performed from the position 8*b* to position 9*a*, the jump time being $T_{act}$ thereby jumping 2N=6 tracks towards the outer radius of the disk 1. Then data is read for a duration equivalent to $T_{rot}-7T_{act}$ thus ending at an end position 9*b*. These times can be taken from lines 17 and 18 according to the table shown in FIG. 10.

Then, the next spiral sections to be read begin at a start position 10*a* in order to continue read spiral sections 16, 17 and 18 ended at the position 6*b*. The playback starting at the position 10*a* is performed for a duration equivalent to $T_{act}$ as can be taken from line 20 according to the table of FIG. 10.

The next jump is performed N=3 tracks towards the inner radius of the disk 1 starting at a position 11*a*. The end position is indicated by 11*b*. However, it has to be noted that the tracks 13 and 14 are read twice between the positions 8*a* and 11*b* as they have already been read during playback between the positions 8*a* and 8*b*. Nevertheless, instead of the jump from the position 10*b* to the position 11*a*, a jump towards the outer radius of 2N−1 tracks would have also been allowed. The decision may be triggered by the amount of data available in an output buffer.

According to FIG. 10 during the read out of the paths 11*a* to 11*b* data equivalent to $2T_{act}$ has been buffered.

Counting on the FIGS. 6–9 the number of revolutions from positions 5*b* to 11*b* the total time needed is $2T_{rot}+T_{act}$ as can be taken from line 23 of the table according to FIG. 10. The continuous output data added during the read out between the positions 9*a* and 9*b*, the positions 10*a* and 10*b* and the positions 11*a* and 11*b* is $3T_{rot}-T_{act}$. Thus, the total amount of output data added during the read out as shown in FIGS. 6–9 is $4T_{rot}-2T_{act}$ as being indicated in line 23 of the table according to FIG. 10.

In total for all FIGS. 1–9 the total continuous output data corresponds to $10T_{rot}-2T_{act}$ whereas disk rotations have been performed equivalent to $5T_{rot}+T_{act}$.

Assuming a rotation rate of 50 Hz corresponding to a rotation period of 20 msec at a typical actuator time of 8 msec the efficiency is calculated to $184/324=56.7\%$.

If a disk drive with more than N=3 spots is employed then the efficiency can even be increased. For example an extrapolation to 7 spots shows that an efficiency of about 83% can be achieved in particular in a multi-track 32×DVD-ROM drive at 60 Hz.

The above example have been explained with regard to a disk drive with a constant angular velocity mode, as this case can be easily used to figure out the performance of a multi-track system according to the invention. If, however, the disk is spinning in a constant linear velocity mode, the angles indicated by $T_{act}$ will be different all over the disk, thus rendering the calculation much more complicated. However, when performing the calculation for several tracks, e.g. 20, in constant linear velocity mode, it appears that the constant angular velocity mode model represents a very good approximation.

Nevertheless, the described algorithm is to be used in disk drives using constant angular velocity mode only or disk drives using constant linear velocity mode only or disk drives supporting both, constant angular velocity mode and constant linear velocity mode.

Furthermore, it has to be noted, that the spinning rate can be reduced for a short time, e.g. by 25%, if there is enough data in the output buffer buffering the read data and a most-optimal jump cannot be performed at a particular moment. This is important in order to fill in the buffer. Reducing the spinning rate can be done in constant linear velocity mode or in constant angular velocity mode. If the buffer runs out of data, the system may decide to slightly spin up the disk during playback and when a jump must be performed, take the optimal decision.

Figure 11:
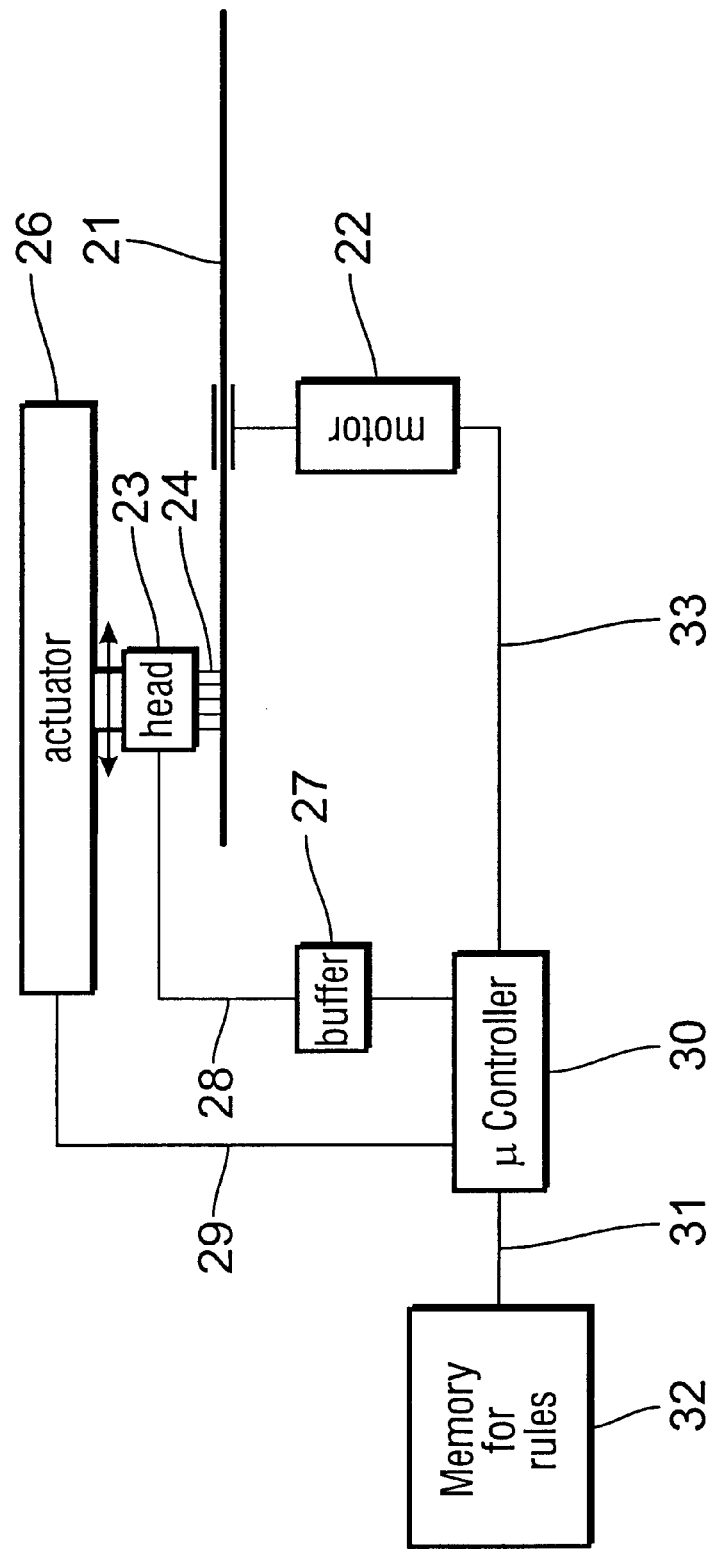
FIG. 11 shows a block diagram showing the structure of an optical disk reading and/or writing apparatus according to an embodiment of this invention.

FIG. 11 shows a block diagram showing the structure of an apparatus for reading and/or writing data on an optical disk 21 driven by a motor 22. A head 23 for reading and/or writing data generates five spots 24 by means of one or more laser diodes. The head 23 is moveable in a radial direction of the disk 21 indicated by the arrow 25 by means of an actuator 26. The data read by the head 23 is stored in a buffer 27 such as a RAM. The buffer 27 is connected via an electrical line 28 with the head 23. Furthermore, the actuator 26 is connected via an electrical line 29 with a microcontroller 30 for controlling actuator jumps for actuating the head 23. The microcontroller 30 is further connected via an electrical line 31 with a memory 32 for storing rules for determining start and end positions of playback paths as described with reference to FIGS. 1–9. The calculation of the actuator jumps is performed by the microcontroller 30 dynamically on the basis of a real-time analysis thereby taking into account the current position of the head 23, the playback paths or spiral sections read so far, the status of the buffer 27, e.g. the filling status of the buffer 27 and the rules stored in the memory 32. A next actuator jump is thus determined on a real-time basis.

It has to be noted that no particular pattern for the actuator jumps is employed, but a real-time analysis is made to determine where the next read and/or write position will be thereby taking the jump time of the actuator into account. For determining the next position a set of rules is employed. The algorithm also provides means to look ahead upon the next expected jump sequence to be performed by the actuator to optimize the playback or recording path. Thereby, the next jump is always dynamically calculated depending on a real-time analysis taking a plurality of rules into account.

In addition, the motor 22 is controlled by the microprocessor 30 in order to adopt the spinning rate to the status of the buffer 27. Therefore, the motor 22 is connected via an electrical line 33 with the microcontroller 30.

The apparatus according to FIG. 11 may be used for reading and/or writing data from/on an optical disk.

Although the embodiments according to FIGS. 1–11 have used an odd number of spots the number N of spots may be even as well as odd. Preferably, the distance between the spots is considered to remain fixed and given by the opto-mechanical construction of the reading/writing unit.

Summarized, there are several aspects behind the new proposal:

A first aspect is that data from a complete disk revolution (i.e., N spiral turns) is stored in the buffer right after a seek command has been performed; this has the advantage that linking of all N spiral turns can be immediately carried out and the user will only notice a delay due to the mechanical seek.

A second aspect is that the jump time of the actuator is always taken into account when a new jump decision is made during continuous playback.

A third aspect is that calculations in advance take place to position the N spots at that location which gives, at the same time maximum read out throughput and continuity in data flow.

A forth aspect is that a jump decision is made based on the following six rules: (i) the use of all N spots is encouraged all the time and has a higher priority in the decision process; (ii) no actuator jumps larger than 2N tracks are allowed; (iii) shorter spiral turns resulted from read gaps towards the inner radius are read out before longer spiral turns; (iv) if there is no gap to be decided for, inner actuator jumps have priority; (v) actuator jumps towards the inner as well as outer disk radius are allowed; and (vi) short spiral turns may be passed twice if this can be accomplished in less time than jumping to another location towards the outer disk radius.

The proposed playback or recording algorithm has the following particularities:

There is no predefined actuator jump length. On the contrary all jumps are dynamically calculated depending on several conditions existing before a jump decision is being made. This particular behavior represents one of the strengths of the proposed playback or recording algorithm. It is therefore possible for an N spot system to link buffer data from any point between −2N and +2N tracks with respect to its current position.

Another particular aspect of the proposed read out technique is that calculations related to the next playback position can be performed for several disk revolutions in advance. A simple genetic-like algorithm can be employed to calculate the optimal choice. In a genetic-like algorithm as many as possible choices to be made in the future are evaluated and the best of these survives. The main constraints should be, however, the read out first remaining gaps along the disk spiral while still using all N spots and to ensure a continuous stream of data.

A further particularity of the proposed algorithm is that a correlation is made between the disk rotational frequency and the time to elapse before the buffer will run out of data. If the latter situation is likely to occur, the system may overrule the most-optimal-jump decision and/or slightly reduce the disk spinning rate. On the contrary, if there is enough data in the buffer, the algorithm may decide to read N spiral turns further away instead of completing only one spiral turn at the inner side.

By avoiding a particular actuator jump pattern, the invention enables to increase the efficiency of a multi-track optical disk drive considerably.

What is claimed is:

1. A method for reading and/or writing a data disk (1) wherein said data is stored on said disk (1) in a continuous spiral form, thereby
   a) rotating said disk (1) relative to a reading and/or writing unit (23) for reading and/or writing said data,
   b) said reading and/or writing unit (23) being actuated by actuating means, and
   c) reading and/or writing said data simultaneously in N tracks (4–8, 12–20) by N spots (24), N being an integer of 2 or greater,
   d) said reading and/or writing being performed by alternating between a continuous reading and/or writing and an actuator jump characterized by
   e) calculating the next actuator jump dynamically on the basis of a real-time analysis determining a next position of said reading and/or writing unit (23) relative to said disk (1).

2. A method according to claim 1, characterized by reading and/or writing data from a complete disk (1) revolution after a seek command has been performed.

3. A method according to claim 1, characterized by calculating the next jump on the basis of the following rules:

a) encouraging the use of all N spots (24), b) prohibiting track jumps larger than 2 N tracks (4–8, 12–20), c) reading and/or writing shorter spiral sections resulted from read or write gaps resulting from unread or unwritten spiral sections at an inner radius before longer spiral sections, d) privileging actuator jumps towards the inner disk radius if there is no read or write gap to be decided for, e) allowing actuator jumps towards the inner as well as the outer disk radius, and/or f) reading and/or writing short spiral sections twice if this can be accomplished in less time than jumping to another position towards the outer disk radius.

4. A method according to claim 3, characterized by rule a) having priority over rule b), rule b) having priority over rule c), rule c) having priority over rule d), rule d) having priority over rule e), and/or rule e) having priority over rule f).

5. A method according to claim 1, characterized by calculating a next jump position for several disk revolutions in advance.

6. A method according to claim 1, characterized by calculating a disk rotational frequency depending on a time to elapse before a data buffer (27) for buffering data will run out of data.

7. A method according to claim 1, characterized by calculating the next jump position depending on the time to elapse before said data buffer (27) will run out of data.

8. A method according to claim 1, characterized by taking a jump time for performing a track jump into account when calculating the next jump position.

9. An apparatus for reading and/or writing a data disk (1), the data being stored on said disk (1) in a continuous spiral form, the apparatus comprising a) rotating means for rotating said disk relative to a reading and/or writing unit (23) for reading and/or writing said data, b) said reading and/or writing unit comprising reading and/or writing means having N spots for reading and/or writing said data simultaneously from/in N tracks, N being an integer of 2 or greater, c) actuator means (26) for actuating said head (23) being designed to perform alternation between a continuous reading and/or writing and an actuator jump, characterized by d) calculation means (30) for calculating the next actuator jump dynamically on the basis of a real-time analysis determining a next position of said reading and/or writing unit (23) relative to said disk (1).

10. An apparatus according to claim 9, characterized by storing means (32) for storing a set of rules for determining said next position.

11. An apparatus according to claim 10, characterized by means for performing a method according to any of claims 1 to 8.

* * * * *